W. Rowell,
Mechanical Movement.
N°. 64,451.   Patented May 7, 1867.

Witnesses:
Chas Morrill
E. W. Rowell

Inventor:
Warren Rowell

United States Patent Office.

WARREN ROWELL, OF NEW YORK, N. Y.

Letters Patent No. 64,451, dated May 7, 1867.

---

IMPROVEMENT IN TRANSMITTING MOTION.

---

The Schedule referred to in these Letters Patent and making part of the same.

---

TO ALL WHOM IT MAY CONCERN:

Be it known that I, WARREN ROWELL, of the city, county, and State of New York, have invented a new and improved Mode of Transmitting Motion; and I do hereby declare that the following is a full and exact description thereof, reference being had to the accompanying drawings, and to the letters of reference marked thereon, in which—

Figure 1:
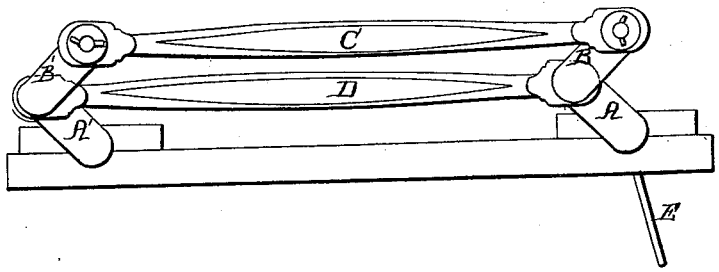
Figure 1 is a side elevation.
Figure 2:
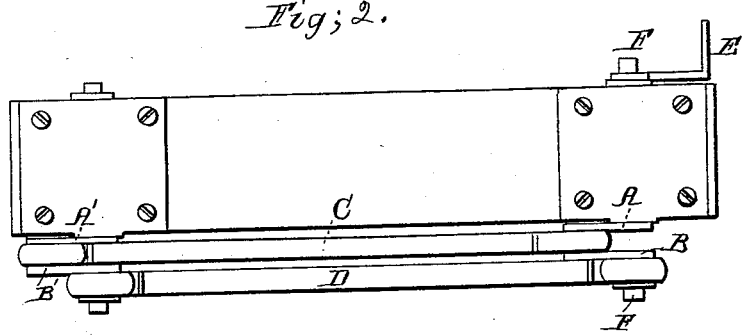
Figure 2 is a plan view.
Figure 3:
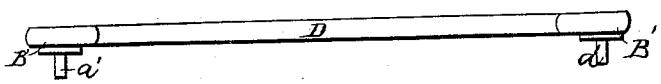
Figure 3 is the connecting-rod C detached, showing the square pivots $a\ a$.
Figure 4:
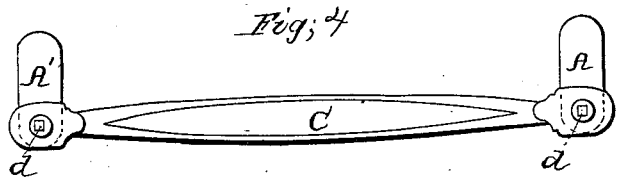
Figure 4 is the connecting-rod D detached, showing the square sockets $d\ d$, for the reception of the pivots $a\ a$.

The object of my invention is for the purpose of transmitting a continuous coincident rotary motion from one revolving shaft to another without the aid of toothed gearing or belting, and for any distance within the limits of an ordinary building, or for such places as the exposure to the weather or other circumstances would prevent the use of belting.

To enable others skilled in the art to make and use my invention, I will proceed to describe its construction and operation.

On the end of a revolving shaft, F, moved by the handle E, and from which I take the motion, I place a crank, A, which I denominate the primary crank, and on the crank-pin of the crank A I place another crank, B, of suitable length and in the proper position, (I do not limit myself to any particular length or position,) which I denominate the secondary crank, and on the end of the shaft to which I wish to communicate motion I place also a primary crank, A′, and secondary crank, B′. Now by means of connecting-rods C D, attached to and moving by the primary cranks A A′ and secondary cranks B B′, I transmit a continuous rotary motion from a shaft that is revolving to one that I wish to revolve.

*Claim.*

I claim the hereinbefore-described means for transmitting a continuous coincident rotary motion.

WARREN ROWELL.

Witnesses:
CHAS. MORRILL,
ASA FARR, Jr.